B. E. HARTSUCH.
PROCESS FOR PURIFYING SALT BRINE.
APPLICATION FILED APR. 26, 1916.

1,235,202.

Patented July 31, 1917.

WITNESSES:
Robert V. V. Rice
W. Cyrus Rice

INVENTOR:
Bruce E. Hartsuch
By his ATTORNEY
Cyrus W. Rice

UNITED STATES PATENT OFFICE.

BRUCE E. HARTSUCH, OF EAST LANSING, MICHIGAN, ASSIGNOR TO THE BUCKLEY AND DOUGLAS LUMBER COMPANY, A CORPORATION OF MICHIGAN.

PROCESS FOR PURIFYING SALT BRINE.

1,235,202.      Specification of Letters Patent.      Patented July 31, 1917.

Application filed April 26, 1916. Serial No. 93,572.

*To all whom it may concern:*

Be it known that I, BRUCE E. HARTSUCH, a citizen of the United States, residing at East Lansing, in the county of Ingham and State of Michigan, have invented new and useful Improvements in Processes for Purifying Salt Brine, of which the following is a specification.

The present invention relates in general to processes for making common salt (chemically NaCl) and particularly to processes for eliminating certain impurities from the brine containing such salt; and its object is generally to provide such a process which shall be simple, economical and effective.

This brine from which said salt is obtained by the ordinary and well-known methods, contains among other impurities, calcium sulfate ($CaSo_4$), calcium chlorid ($CaCl_2$) and magnesium chlorid ($MgCl_2$).

In carrying out my process for eliminating these impurities, such brine is placed in a suitable tank and subjected to the action of certain apparatus, as that shown in the accompanying drawings, in which:—

Figure 1:
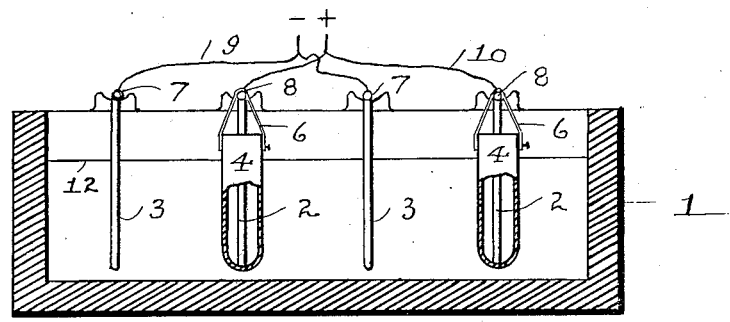
Figure 1 shows in vertical section, on a plane corresponding to line 1—1 of Fig. 2, a brine containing tank, with electrical apparatus.
Figure 2:
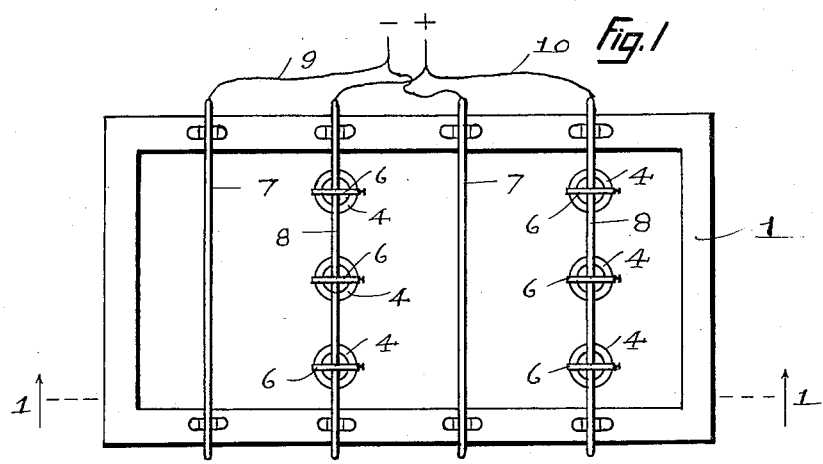
Fig. 2 is a top plan view of the same.
Figures 3, 4:
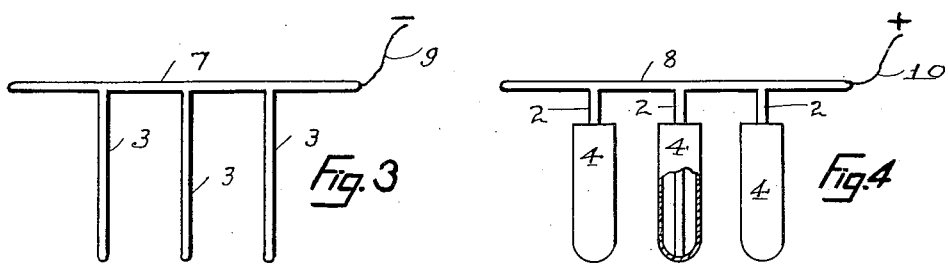
Fig. 3 is a side view of negative electrodes and their supporting bar.
Fig. 4 is a similar view of positive electrodes, their surrounding tubes, and supporting bar.
Figure 5:
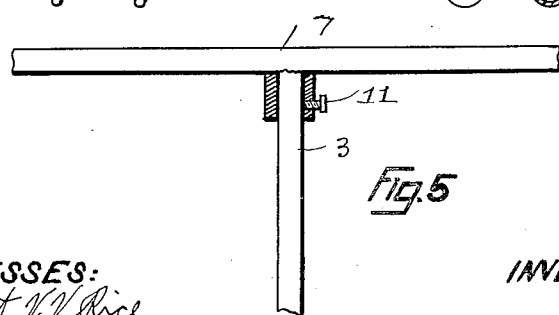
Fig. 5 is a fragmentary view of a form of detachable connection for such electrode to its supporting bar.

In these drawings, 1 is the tank; 2 the positive electrodes; 3 the negative electrodes; 4 open topped tubes closed at their bottoms and surounding the positive electrodes; 6, straps or hangers to support the tubes; 7, 8 cross bars by which the electrodes are supported; 9, 10 electrical connecting wires whereby electric current is conducted through the bars to the electrodes supported thereby; 11 a set screw for detachably connecting an electrode to its bar; 12 the level of the brine contained in the tank.

An electric current under pressure of about one hundred and ten volts is passed from a suitable source (not shown) through the brine from the positive electrodes to the negative electrodes, all which electrodes are immersed in the brine and are spaced preferably about two feet apart. The current density must be so small (as now believed from two and one half to three and one half amperes per square decimeter of cathode surface) and the time period of its passage through the brine must be so short that the saline quality of the brine is not destroyed or seriously impaired thereby. In practice, the current density should be about three amperes per square decimeter of cathode surface and the time period should be about six and one half hours where the electrodes—which are continuous vertical current-carrying rods—are placed about two feet apart, extend to about 15 inches of the bottom, are arranged in rows about two feet apart each way and are disposed in a horizontal plane in the manner shown in the drawings.

In the typical construction illustrated, the tank is about sixteen by twenty feet in area and is filled with brine to the depth of about six feet; the electrodes are about two inches in diameter and are immersed about four feet and nine inches; the tubes are about six inches in diameter inside and their walls are about three quarters of an inch thick.

It will be understood that if the current density is less, the time period must be greater and vice versa: and if the electrodes are spaced farther apart, the current density or the time period must be proportionally greater. The passage of the electric current through the brine forms chlorin gas ($Cl_2$) at the positive electrodes and sodium hydroxid (NaOH) at the negative electrodes. The chlorin gas passes from the positive electrodes through the open-topped tubes which suround said electrodes and extend above the surface of the brine. These tubes are of a material—as unglazed porcelain—sufficiently absorbent of the brine to conduct the electric current through their walls, but not so porous as to allow the gas to escape through such walls into the brine outside.

During the passage of the electric current therethrough, the brine is preferably stirred in order to diffuse the sodium hydroxid therethrough. This sodium hydroxid chemically reacts with the impurities above named calcium chlorid, calcium sulfate and magnesium chlorid—and forms therefrom new and insoluble compounds.

During a period of three or four hours after the electric current is turned off and the stirring ceases, these newly-formed insoluble compounds settle to the bottom of the tank, whereupon the brine is drawn off and the water evaporated to leave the salt, in the well-known manner.

The process is better carried out with the brine at ordinary temperature—say 70° Fahr.

Certain tests may be employed to indicate when the process is completed: such as withdrawing a sample of the brine, filtering and testing the filtrate for calcium by means of ammonia oxalate; or, withdrawing a sample of the brine, filtering and testing the filtrate for NaOH by means of acid.

I claim:

The process of eliminating impurities of the character described from brine of the character described, which consists in generating the purifying agent within the brine itself by passing an electric current through the brine between spaced positive and negative electrodes and in maintaining the purifying agent in a pure condition by preventing the chlorin gas resulting from such electric action from mixing with the purifying agent while acting on the brine.

In testimony whereof I have hereunto set my hand in presence of two subscribing witnesses.

BRUCE E. HARTSUCH.

Witnesses:
MERRIS MICKEY McCOOL,
CHARLES ERNEST MILLAR.